US011946389B2

(12) United States Patent
Okajima et al.

(10) Patent No.: US 11,946,389 B2
(45) Date of Patent: Apr. 2, 2024

(54) TURBINE ROTOR BLADE AND CONTACT SURFACE MANUFACTURING METHOD

(71) Applicant: Mitsubishi Power Ltd., Kanagawa (JP)

(72) Inventors: Yoshifumi Okajima, Tokyo (JP); Masahiko Mega, Tokyo (JP); Taiji Torigoe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 257 days.

(21) Appl. No.: 17/431,827

(22) PCT Filed: Feb. 18, 2020

(86) PCT No.: PCT/JP2020/006318

§ 371 (c)(1),
(2) Date: Aug. 18, 2021

(87) PCT Pub. No.: WO2020/184092

PCT Pub. Date: Sep. 17, 2020

(65) Prior Publication Data

US 2022/0154583 A1 May 19, 2022

(30) Foreign Application Priority Data

Mar. 12, 2019 (JP) ................................. 2019-045288

(51) Int. Cl.
*F01D 5/28* (2006.01)

(52) U.S. Cl.
CPC .......... *F01D 5/288* (2013.01); *F05D 2230/90* (2013.01); *F05D 2300/611* (2013.01)

(58) Field of Classification Search
CPC .......... F01D 5/288; F01D 5/225; F01D 5/147; F05D 2230/90; F05D 2300/611
See application file for complete search history.

(56) References Cited

U.S. PATENT DOCUMENTS 4,822,248 A * 4/1989 Wertz ...................... F01D 5/225 29/889.1
4,966,820 A * 10/1990 Kojima .................. C23C 28/00 428/629

(Continued)

FOREIGN PATENT DOCUMENTS

EP 2537959 12/2012
JP 01-279781 11/1989

(Continued)

OTHER PUBLICATIONS

Office Action dated Apr. 3, 2023 in corresponding Korean Patent Application No. 10-2021-7026202, with English language translation.

(Continued)

*Primary Examiner* — Courtney D Heinle
*Assistant Examiner* — Andrew Thanh Bui
(74) *Attorney, Agent, or Firm* — Wenderoth, Lind & Ponack, L.L.P.

(57) ABSTRACT

A turbine rotor blade includes a blade body and a tip shroud on a tip of the blade body. The tip shroud has a contact block configured to face a tip shroud of an adjacent turbine rotor blade, and the contact block includes a base material, an oxidation resistant coating on the surface of the base material, and a hard wear resistant coating on the surface of the oxidation resistant coating.

11 Claims, 7 Drawing Sheets

(56) References Cited

U.S. PATENT DOCUMENTS

| | | | | |
|---|---|---|---|---|
| 6,129,991 | A | 10/2000 | Warnes et al. | |
| 6,164,916 | A * | 12/2000 | Frost | F01D 5/225 148/528 |
| 10,598,030 | B2 * | 3/2020 | Kottilingam | C21D 9/0068 |
| 2002/0127111 | A1 | 9/2002 | Tomita et al. | |
| 2007/0202269 | A1 * | 8/2007 | Potter | C23C 28/3455 427/140 |
| 2010/0062173 | A1 | 3/2010 | Torigoe et al. | |
| 2012/0195766 | A1 * | 8/2012 | Cohin | F01D 5/225 416/241 A |
| 2014/0154082 | A1 * | 6/2014 | Shinn | B23K 1/20 228/119 |
| 2017/0268350 | A1 * | 9/2017 | Tabata | C23C 4/02 |
| 2019/0168327 | A1 | 6/2019 | Yoshida et al. | |
| 2019/0233949 | A1 | 8/2019 | Yoshizawa et al. | |
| 2019/0275611 | A1 * | 9/2019 | Mangano | B23K 26/0006 |
| 2020/0063570 | A1 * | 2/2020 | Parker | F01D 5/288 |
| 2021/0115800 | A1 * | 4/2021 | Hirata | F01D 5/225 |

FOREIGN PATENT DOCUMENTS

| | | |
|---|---|---|
| JP | 06-256786 | 9/1994 |
| JP | 09-196176 | 7/1997 |
| JP | 11-172463 | 6/1999 |
| JP | 2001-152803 | 6/2001 |
| JP | 2002-106360 | 4/2002 |
| JP | 2005-105417 | 4/2005 |
| JP | 2010-255044 | 11/2010 |
| JP | 2013-1923 | 1/2013 |
| JP | 2018-59471 | 4/2018 |
| JP | 2018-168771 | 11/2018 |
| WO | 2018/087945 | 5/2018 |

OTHER PUBLICATIONS

Office Action dated Dec. 5, 2022 in corresponding Chinese Patent Application No. 202080015104.3, with partial English translation.

Xuejiao et al., "Research Development of Thermal Barrier Coatings," China Ceramics, vol. 49, No. 3, 2013, with machine translation.

English Translation of Written Opinion dated Apr. 14, 2020 in corresponding International (PCT) Patent Application No. PCT/JP2020/006318.

International Search Report dated Apr. 14, 2020 in corresponding International (PCT) Patent Application No. PCT/JP2020/006318.

Official Action dated Jul. 28, 2023 in German Patent Application No. 11 2020 001 189.5, with English translation.

* cited by examiner

TURBINE ROTOR BLADE AND CONTACT SURFACE MANUFACTURING METHOD

FIELD

The present invention relates to a turbine rotor blade and a contact surface manufacturing method.

BACKGROUND

A gas turbine for generating power, which a type of turbomachinery, includes compressor, a combustor, and a turbine, for example. The compressor compresses the air collected through an air intake into high-temperature and high-pressure compressed air. The combustor then supplies fuel into the compressed air and combusts the mixture, to acquire high-temperature and high-pressure combustion gas (actuating fluid). This gas drives the turbine, and causes the turbine to drive a generator coupled thereto.

In the turbine of the gas turbine, the length of the first-stage rotor blade or the second-stage rotor blade, which belong to a front stage, in their height direction (in the radial direction of the rotational shaft) are short, but the length of the third-stage rotor blade or the fourth-stage rotor blade (last-stage rotor blades), which belong to a rear stage, in their height direction are kept long (long blades), from the viewpoint of the performance. Because turbine rotor blades that are long in the height direction tend to vibrate more, tip shrouds are mounted on the tips of the rotor blades, and tip shrouds of the adjacent rotor blades are brought into contact with each other so that an annular shroud is formed thereby. Coatings are provided on the surfaces of contact portions where the shrouds of the rotor blades are brought into contact with each other (see Japanese Patent Application Publication No. 2010-255044).

SUMMARY

Technical Problem

When the contact surface of a tip shroud in the turbine rotor blade becomes damaged, maintenance tasks such as repair or replacement becomes necessary. Furthermore, such maintenance is sometimes not possible when the base material of the contact surface becomes damaged. Therefore, there has been a demand for improving the durability of the contact surface.

At least one embodiment of the present invention is intended to solve the technical problem described above, and an object of the present invention is to provide a turbine rotor blade and a contact surface manufacturing method capable of improving the durability of the contact surface, to improve the reliability of the blade.

Solution to Problem

In order to achieve the object described above, a turbine rotor blade includes a blade body; and a tip shroud that is provided to a tip of the blade body. The tip shroud has a contact block facing an adjacent tip shroud. The contact block includes a base material; an oxidation resistant coating laid on a surface of the base material; and a hard wear resistant coating laid on a surface of the oxidation resistant coating.

The oxidation resistant coating is preferably made of MCrAlY alloy.

The oxidation resistant coating is preferably made of CoNiCrAlY alloy.

The hard wear resistant coating preferably has a thickness of 0.02 mm or more and 0.30 mm or less, and the oxidation resistant coating preferably has a thickness of 0.02 mm or more and 0.20 mm or less.

In the hard wear resistant coating and the oxidation resistant coating, (a thickness of the oxidation resistant coating)/(a thickness of the hard wear resistant coating) is preferably 0.7 or more and 1.3 or less.

The oxidation resistant coating is preferably laid at least on an area that is not likely to be brought into contact with a facing contact block, on a surface of the contact block that faces the adjacent tip shroud.

The hard wear resistant coating is preferably laid only on the contact block.

The blade body preferably has a thermal barrier coating laid on a surface of a blade surface.

In order to achieve the object described above, a contact surface manufacturing method is for forming a contact surface on a surface of a contact block of a tip shroud provided to a turbine rotor blade. The contact surface manufacturing method includes an oxidation resistant coating formation step of forming an oxidation resistant coating on a surface of the base material, and a hard wear resistant coating formation step of forming a hard wear resistant coating on a surface of the oxidation resistant coating.

The contact surface manufacturing method preferably includes a blade surface oxidation resistant coating formation step of forming an oxidation resistant coating on a blade surface of the turbine rotor blade after the hard wear resistant coating formation step, and also includes a step of performing tip brazing, a stabilization treatment, and a thermal diffusion treatment after the blade surface oxidation resistant coating formation step.

The contact surface manufacturing method preferably includes a blade surface undercoat formation step of forming an oxidation resistant coating on a blade surface of the turbine rotor blade before the hard wear resistant coating formation step.

The turbine rotor blade is preferably a used turbine rotor blade, and the contact surface manufacturing method preferably includes the step of removing a used contact surface formed on a surface of a contact block before the oxidation resistant coating is formed.

Advantageous Effects of Invention

According to one embodiment of the present invention, it is possible to improve the durability of a contact surface of a tip shroud, to reduce the risk of damages to the base material, and to improve the reliability of the rotor blade.

DESCRIPTION OF EMBODIMENTS

A turbine rotor blade and a contact surface manufacturing method according to a preferred embodiment of the present invention will now be explained in detail with reference to the appended drawings. This embodiment is, however; not intended to limit the scope of the present invention in any way.

Figure 1:
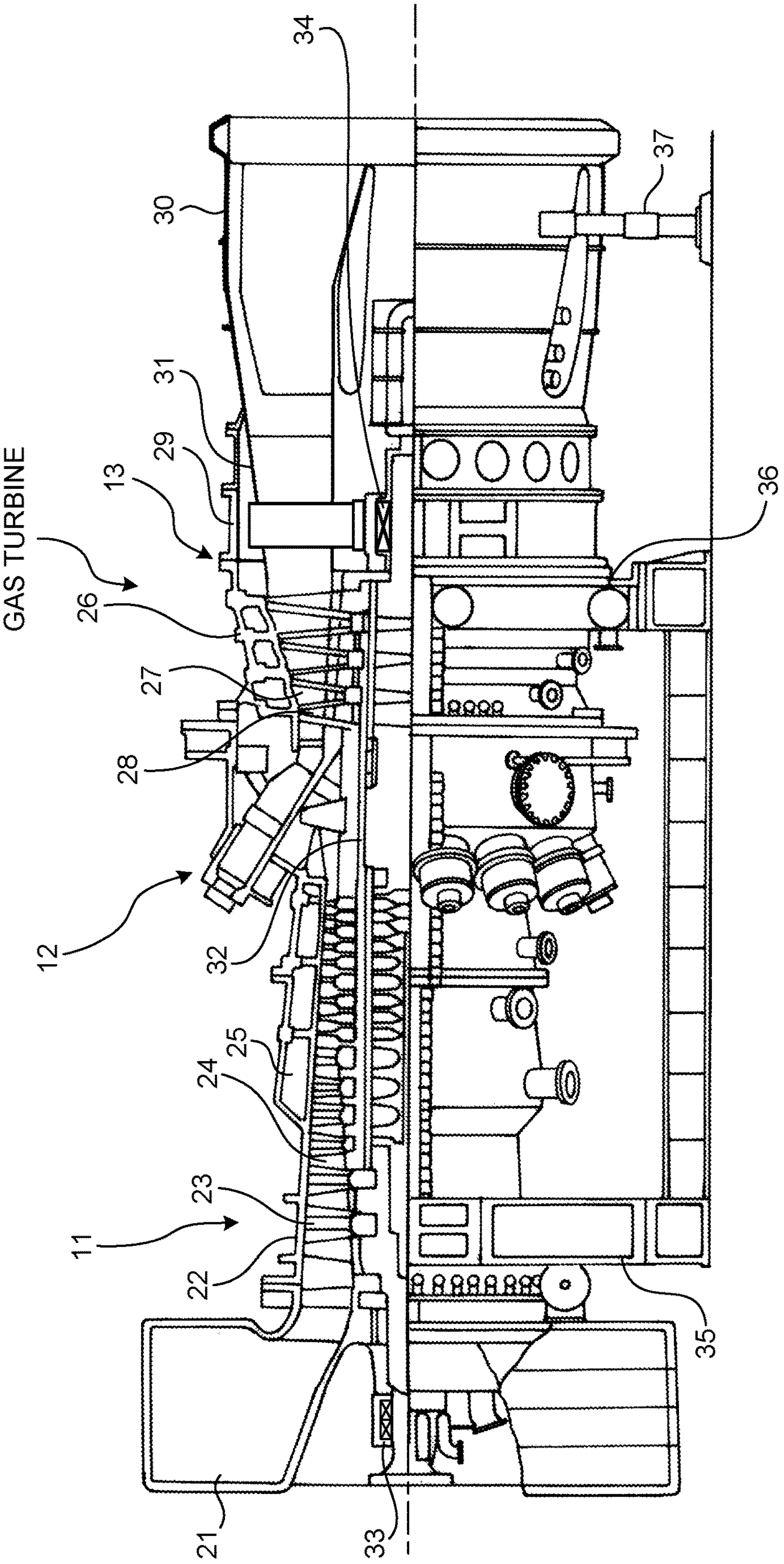
FIG. 1 is a general schematic illustrating a gas turbine that uses turbine rotor blades according to the embodiment.
Figure 2:
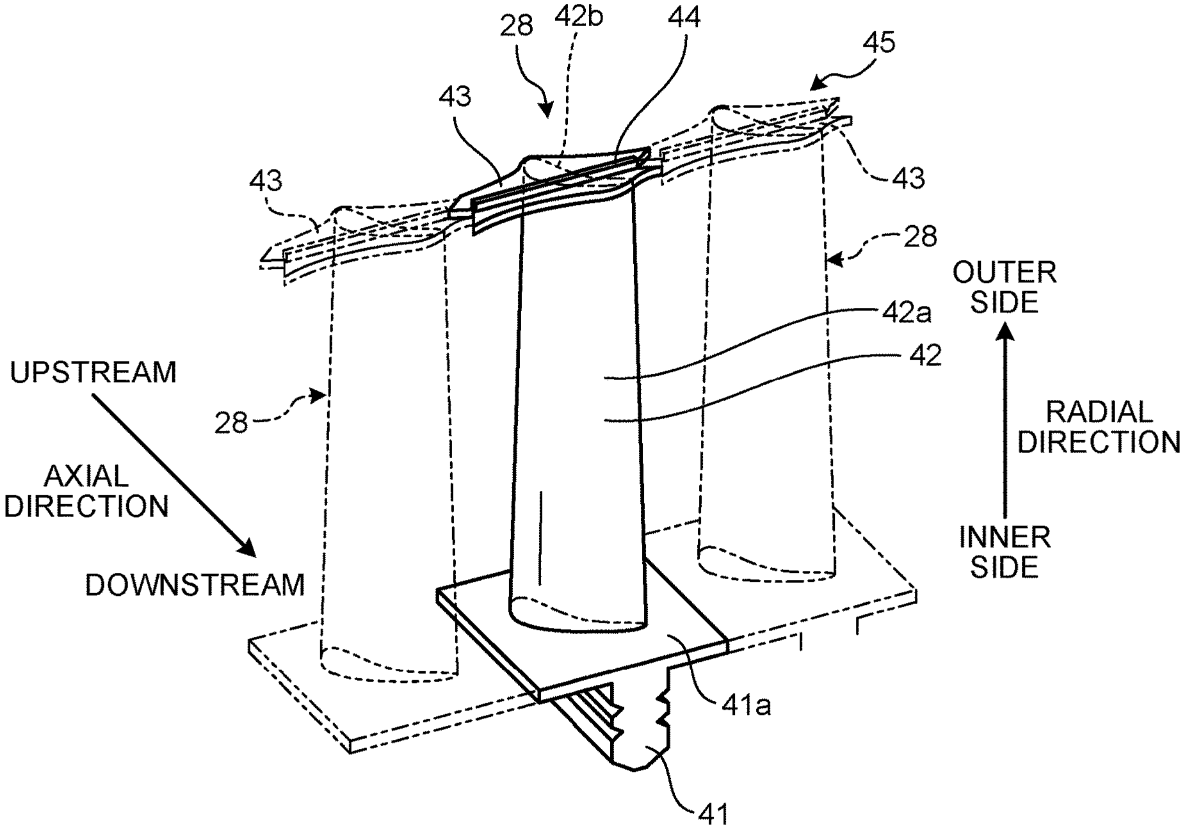
FIG. 2 is a general schematic illustrating an assembly of turbine rotor blades according to an embodiment.

FIG. 1 is a general schematic illustrating a gas turbine that uses turbine rotor blades according to the embodiment. FIG. 2 is a general schematic illustrating an assembly of turbine rotor blades according to the embodiment. The gas turbine according the embodiment includes a compressor 11, a combustor 12, and a turbine 13, as illustrated in FIG. 1, A generator, not illustrated, is coupled to the gas turbine, and is capable of generating power.

The compressor 11 includes an air intake 21 for collecting the air, a plurality of compressor vanes 23 and compressor blades 24 that are arranged alternatively in the front-and-back direction (the axial direction of a rotor 32, which will be described later) inside a compressor chamber 22, and an air bleed chamber 25 provided outside of the compressor chamber 22. The combustor 12 is capable of combusting fuel by supplying the fuel into compressed air compressed in the compressor 11, and igniting the mixture. The turbine 13 includes a plurality of stator blades 27 and rotor blades 28 that are arranged alternatively in the front-and-back direction (the axial direction of the rotor 32, which will be described later) inside a turbine chamber 26. An exhaust hood 30 is arranged on the downstream side of the turbine chamber 26, with an exhaust hood 29 interposed therebetween. The exhaust hood 30 has an exhaust diffuser 31 that is connected to the turbine 13.

A rotor (rotational shaft) 32 is positioned penetrating through the centers of the compressor 11, the combustor 12, the turbine 13, and the exhaust hood 30. One end of the rotor 32 on the side of the compressor 11 is supported rotatably by a bearing 33, and the other end on the side of the exhaust hood 30 is supported rotatably by a bearing 34.

In this gas turbine, feet 35 support the compressor chamber 22 of the compressor 11. Feet 36 support the turbine chamber 26 of the turbine 13, and feet 37 support the exhaust hood 30.

Therefore, the air collected through the air intake 21 in the compressor 11 passes through the compressor vanes 23 and the compressor blades 24, and becomes compressed into high-temperature and high-pressure compressed air. The combustor 12 then supplies given fuel into the compressed air, and combusts the fuel. This high-temperature and high-pressure combustion gas that is the actuating fluid generated in the combustor 12 (actuating fluid) passes through the stator blades 27 and the rotor blades 28 in the turbine 13, and drives the rotor 32 in rotation, thereby driving the generator coupled to the rotor 32. The exhaust diffuser 31 in the exhaust hood 30 converts the energy of the flue gas (combustion gas) is converted into pressure, and decelerates and discharges the flue gas into the atmosphere.

In the turbine 13 according to the embodiment described above, the rotor blades (turbine rotor blades) 28 in the rear stage are provided with tip shrouds. Examples of the rear-stage rotor blades include third-stage rotor blades. As illustrated in FIG. 2, each of the rotor blades 28 includes a blade root 41 fixed to a disk (the rotor 32), a blade body 42 having its base end joined to the blade root 41, a tip shroud 43 coupled to the tip of the blade body 42, and a seal fin (seal fin) 44 provided to the outer surface of the tip shroud 43. The blade body 42 has a suction surface 42*a* and a pressure surface 42*b*. The suction surface 42*a* is a suction-side surface, having a convex cross section on the surface along which the flue gas flows. The pressure surface 42*b* is a pressure-side surface, having a concave section on the surface along which the flue gas flows. The blade body 42 is twisted by a given angle. With the blade roots 41 of a plurality of the rotor blades 28 engaged to the outer circumference of the disk along the circumferential direction, the tip shrouds 43 are brought into contact with each other, and connected to each other. By bringing the tip shrouds 43 of the rotor blades 28 into contact with each other, an annular shroud is formed on the outer circumferential side of the turbine 13.

Figure 3:
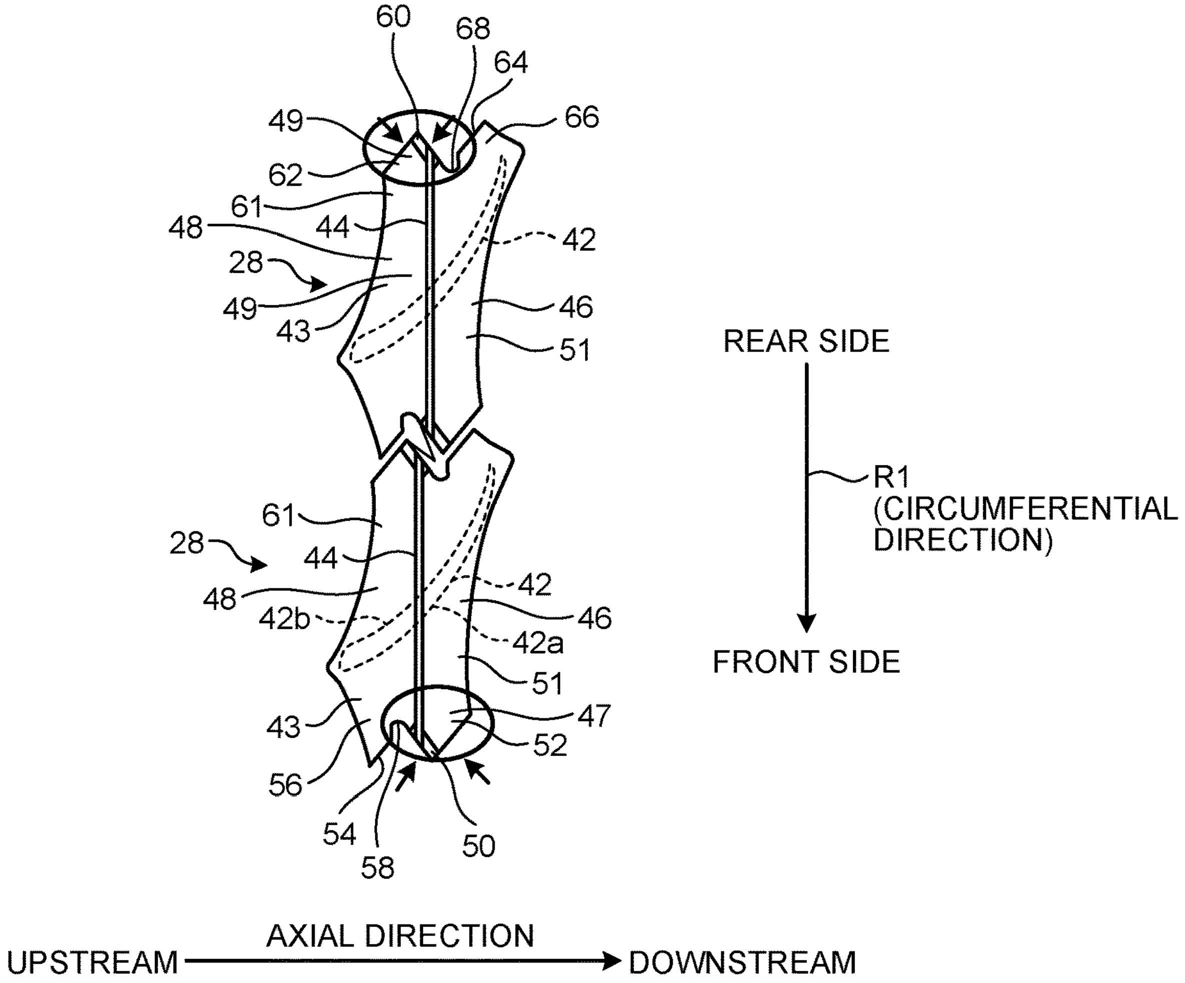
FIG. 3 is a schematic illustrating a general structure of tip shrouds provided to the turbine rotor blades.
Figure 4:
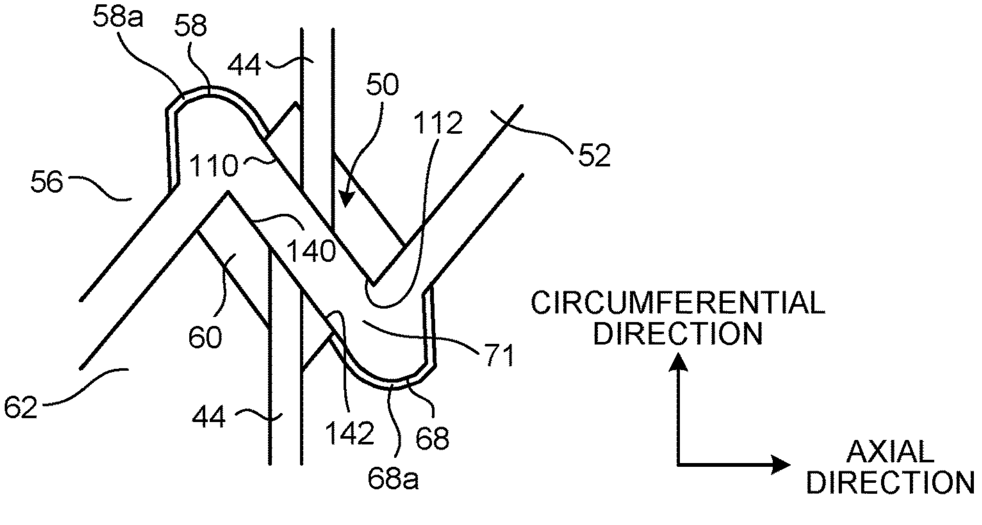
FIG. 4 is a schematic giving an enlarged view of contact portions and nearby elements in the tip shrouds.
Figure 5:
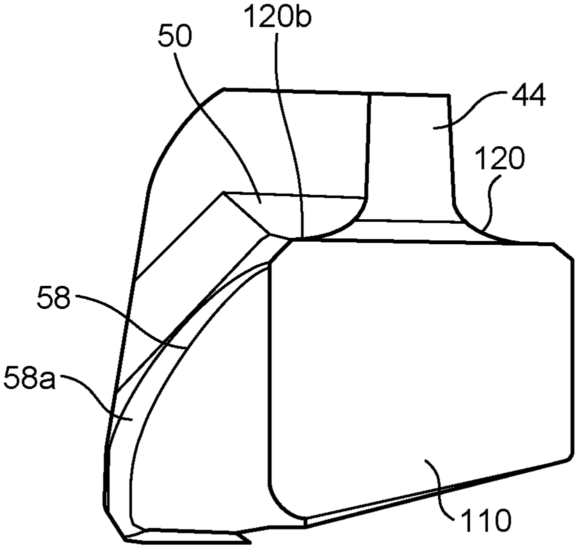
FIG. 5 is a front view illustrating a general structure of a suction-side contact portion.
Figure 6:
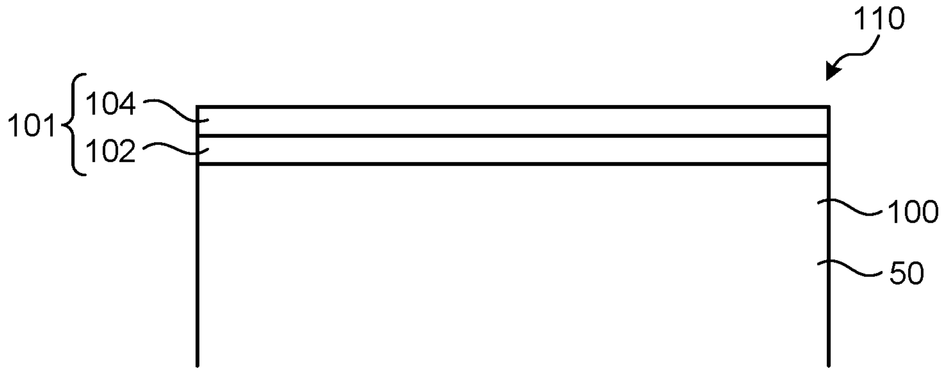
FIG. 6 is a sectional view illustrating a general structure of the suction-side contact portion.

A detailed structure of the tip shroud 43 now be explained, using FIGS. 4 to 6, in addition to FIG. 3. FIG. 1 is a schematic giving an enlarged view of contact portions and nearby elements in the tip shrouds. FIG. 5 is a front view illustrating a general structure of a suction-side contact portion. FIG. 6 is a sectional view illustrating a general structure of the suction-side contact portion.

Figure 9:
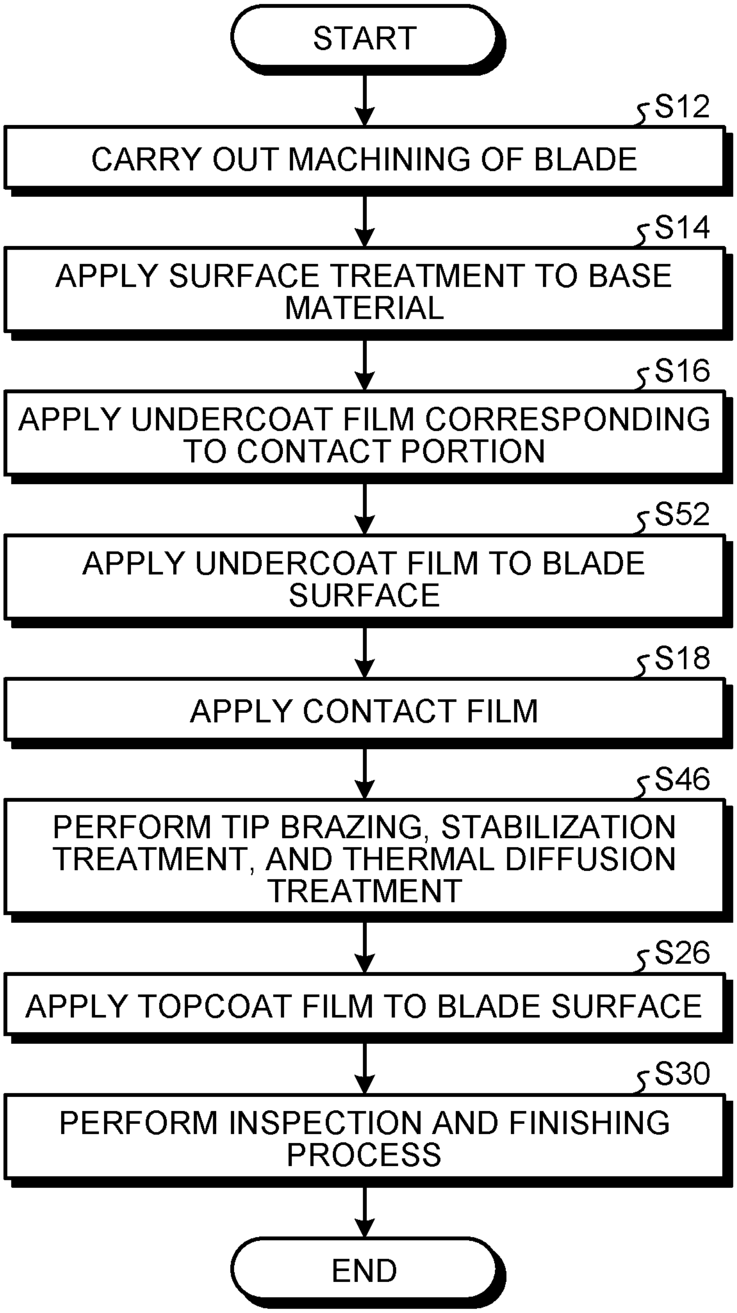
FIG. 9 is a flowchart illustrating one example of the contact surface manufacturing method.

The tip shroud 43 has a long plate-like shape extending in the circumferential direction of the shroud, and is inclined, outwards in the radial direction, in a direction from the pressure surface (the pressure-side blade surface) toward the suction surface (the suction-side blade surface) in the axial direction (see FIG. 9 in Japanese Patent Application Publication No. 2010-255044). The tip shroud 43 includes a suction-side tip shroud 46 extending on the side of the suction surface 42*a* of the blade body 42, and a pressure-side tip shroud 48 extending on the side of the pressure surface 42*b* of the blade body 42. In the turbine rotor blade 28, the fin 44 extending outwards in the radial direction is provided on the outer top surface of the suction-side tip shroud 46 and the pressure-side tip shroud 48 in the radial direction. The fin 44 is disposed at the center of the tip shroud 43 in the circumferential direction, and extends in the circumferential direction of the rotor blade 28. The fin 44 has a fillet 120 on the part connected with the tip shroud 43. In other words, there is a region corresponding to the fillet 120 on an inner end of the fin 44 in the radial direction, which is on the side of the tip shroud 32, and this region has the plate width that becomes wider toward the tip shroud 43.

The suction-side tip shroud 46 has a suction-side contact block 50, and a suction-side cover plate 51 extending from the fin 44 downstream in the axial direction. The suction-side cover plate 51 includes a downstream suction-side cover plate 52 and a downstream pressure-side cover plate 66. The downstream suction-side cover plate s provided on the front end near the suction-side contact block 50, on the suction-side and downstream side of the fin 44 in the axial direction. The downstream pressure-side cover plate 66 is provided on the rear end near the pressure-side contact block 60. The fin 44, the contact block 50, and the suction-side cover plate 51 are integrated with one another. The suction-side cover plate 51 is a plate extending in a direction intersecting with the radial direction with respect to the blade body 42, and is coupled to the blade body 42 on the bottom surface of an upstream end thereof in the axial direction. The suction-side cover plate 51 is coupled to the suction-side contact block 50 near the front end, on the top surface of an upstream end of the suction-side cover plate 51 in the axial direction, and the remaining part of the suction-side cover plate 51 is coupled to the fin 44.

Figure 7:
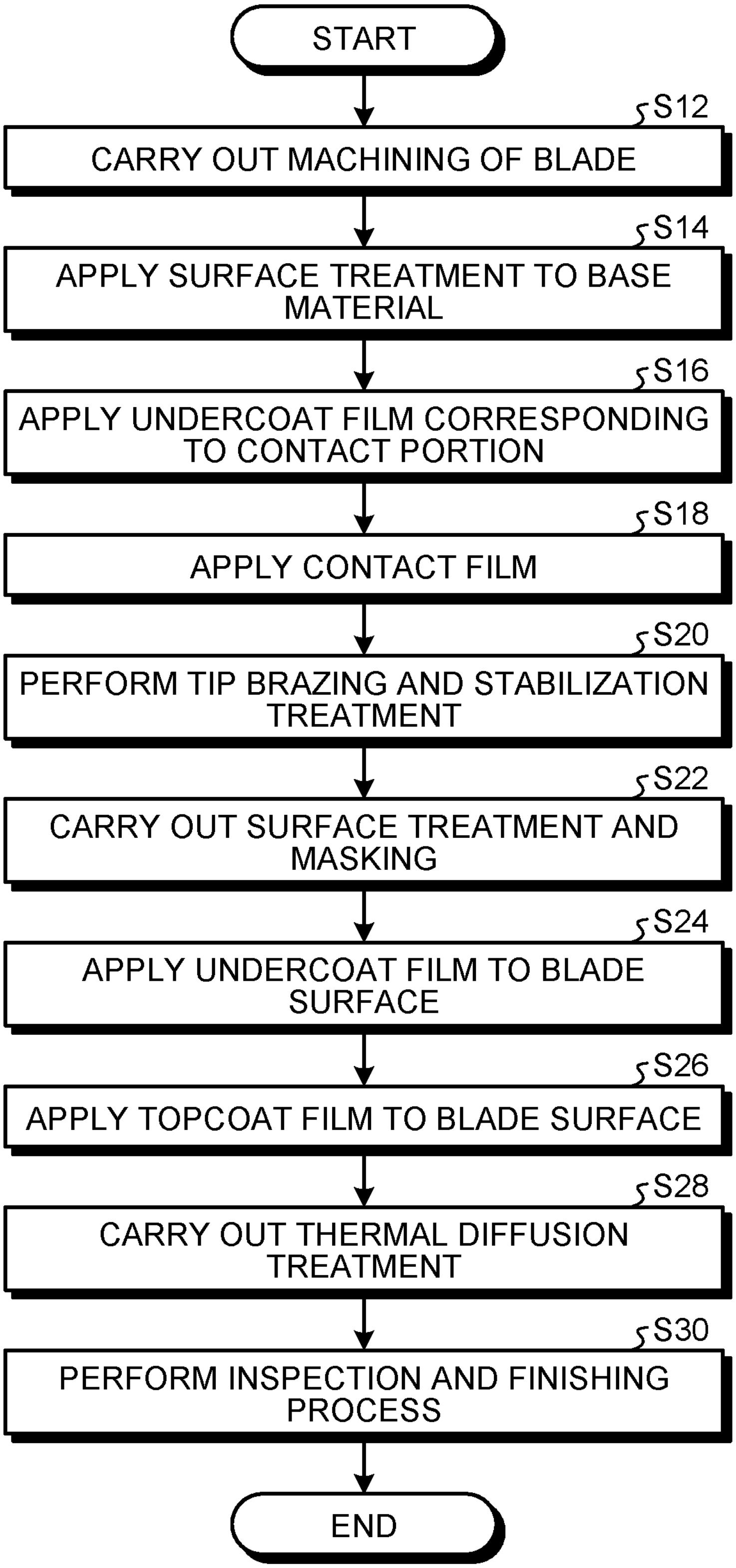
FIG. 7 is a flowchart illustrating one example of a contact surface manufacturing method.

The suction-side contact block 50 is provided to the front end of the suction-side tip shroud 46. The suction-side contact block 50 has a suction-side contact surface (first surface 110 facing the circumferential direction. The suction-side contact block 50 has a structure that is thick in a direction orthogonal to the suction-side contact surface 110, as illustrated in FIG. 7, and the end of the suction-side contact block 50 on the opposite side of the suction-side contact surface 110 is coupled to the downstream suction-side cover plate 52. A coating 101 is formed on a surface of the suction-side contact block 50. An end of the suction-side contact block 50 is joined with the fin 44, the end being on the opposite side of the suction-side contact surface 110 in the circumferential direction, and on the upstream side in the axial direction. The downstream side of the suction-side contact block 50 in the axial direction is joined to the downstream suction-side cover plate 52 of the suction-side tip shroud 46, via an inclined surface 116.

As illustrated in FIG. 4, the suction-side contact surface 110 is a surface that faces a pressure-side contact surface 140 of the pressure-side contact block 60 in the circumferential direction, the pressure-side contact block 60 being included in the tip shroud 43 of the adjacent rotor blade, as will be described later. The downstream suction-side cover plate 52 extends from the suction-side surface of the blade body 42 or from the suction-side contact surface 110, in a direction separating therefrom toward the downstream side in the axial direction, in a manner following the inner circumferential surface 46*b* of the tip shroud 43, the inner being inner in the radial direction. The downstream suction-side cover plate 66 is connected to the downstream end of the pressure-side contact block 60, which will be described later, in the axial direction, via a connecting portion 68. The connecting portion 68 is a convex curved surface protruding toward the pressure surface of the blade body 42.

The pressure-side tip shroud 48 includes the pressure-side contact block 60, and a pressure-side cover plate 61 extending from the fin 44 toward the upstream side in the axial direction. The pressure-side cover plate 61 includes an upstream pressure-side cover plate 56 and an upstream pressure-side over plate 62. The upstream pressure-side cover plate 56 is provided on the front end near the pressure-side contact block 50, on the pressure-side and the upstream side of the fin 44 in the axial direction. The upstream pressure-side cover plate 62 is provided on the rear end near the pressure-side contact block 60. The fin 44, the pressure-side contact block 60, and the pressure-side cover plate 61 are integrated with one another.

The pressure-side contact block 60 is provided to the rear end of the pressure-side tip shroud 48. The pressure-side contact block 60 has a pressure-side contact surface (contact surface) 140 facing the circumferential direction. The pressure-side contact surface 140 is a surface that faces the suction-side contact block 50 (suction-side contact surface 110) of the tip shroud 43 provided to an adjacent turbine rotor blade 28 in the circumferential direction. In other words, the pressure side contact surface 140 is disposed in a manner facing the suction-side contact surface 110 of the adjacent turbine rotor blade 28. The upstream pressure-side cover plate 62 is a plate extending in a direction intersecting with the radial direction in which the blade body 42 stands, and extends from the edge of the suction-side blade surface of the blade body 42 or the suction-side contact surface 110, in a direction separating therefrom toward the upstream side in the axial direction, in a manner following the inner circumferential surface 48*b* of the tip shroud 43. The upstream suction-side cover plate 56 is connected to an upstream end of the suction-side contact block 50 in the axial direction via a connecting portion 58. The connecting portion 58 is a convex curved surface protruding toward the suction-side blade surface of the blade body 42.

Structures of the suction-side contact surface (contact surface) 110 of the suction-side contact block. 50 and of the pressure-side contact surface (contact surface) 140 of the pressure-side contact block 60 will now be explained. As illustrated in FIGS. 3 and 4, the suction-side contact surface 110 faces the pressure-side contact surface 140 of an adjacent turbine rotor blade 28. Although a structure of the suction-side contact surface 110 will be explained below, the pressure-side contact surface 140 has the same structure.

On the pressure-side contact surface 140 of the pressure-side contact block 60, a coating 102 is formed on a base material 100. Because the turbine rotor blade 26 is exposed to a high temperature in the gas turbine, the base material 100 with which the rotor blade is made is made of a highly heat tolerant alloy material such as a Ni base alloy. Examples of the Ni base alloy include a Ni base alloy having a composition containing 12.0% or more and 14.3% or less Cr, 8.5% or more and 11.0% or less Co, 1.0% or more and 3.5% or less Mo, 3.5% or more and 6.2% or less N, 3.0% or more and 5.5% or less Ta, 3.5% or more and 4.5% or less Al, 2.0% or more and 3.2% or less Ti, 0.04% or more and 0.12% or less C, and 0.005% or more and 0.05% or less B, and the rest being Ni and incidental impurities. The Ni base alloy having the composition described above may also contain Zr by 0.001 ppm or more and 5 ppm or less. The Ni base alloy having the composition described above may also contain any one or both of Mg and Ca by 1 ppm or more and 100 ppm, one or two of 0.02% or more and 0.5% or less Pt, 0.02% or more and 0.5% or less Rh, 0.02% or more and 0.5% or less Re, or both.

The base material 100 is formed by casting or forging the material described above. When the base material is to be cast, a base material such as a conventional casting (CC) material, a directional solidification (DS) material, or a single crystal (SC) material may be used. An example in which CC material is used as the base material 100 will now be explained, but the embodiment is not limited thereto, and the base material may be a DS material or an SC material.

The coating 101 is formed on the surface of the base material 100, and provides the contact surface 110. The coating 101 includes an undercoat (oxidation resistant coating) 102 laid on the surface of the base material 100, and a hard wear resistant coating (abrasion resistant coating) 104 laid on the surface of the undercoat 102. The coating 101 is formed across the entire surface contact surface 110.

The undercoat 102 is a coating made of a material that is more oxidation resistant than the base material 100. As the material of the undercoat 102, an alloy material such as MCrAlY may be used. As the material of the undercoat 102, CoNiCrAlY alloy may be more preferably used.

The hard wear resistant coating 104 is a coating made of a material that is more abrasion resistant than the undercoat 102. As the material of the hard wear resistant coating 104, a cobalt-base abrasion resistant material such as Tribaloy (registered trademark) may be used.

In the turbine rotor blade 28, it is possible to form the coating 101 as a coating including a layer of the abrasion resistant coating on top of a layer of the oxidation resistant coating by laying the undercoat (oxidation resistant coating) 102 on the surface that is to become the contact surface 110, and then laying the hard wear resistant coating 104 on top of the undercoat 102. In this manner, it is possible to achieve a contact block in which base material is protected by the oxidation resistant coating even when the hard wear resistant coating 104 becomes damaged. For example, the oxidation resistant coating can protect the base material even when the hard wear resistant coating is lost, no longer brought into contact with the contact surface facing thereto, and becomes exposed to the atmosphere. In this manner, it is possible to achieve a highly durable contact surface. By providing a TBC on the surface of the turbine rotor blade 28, it becomes possible to use the turbine rotor blade 28 in an environment where the temperature is even higher.

It is preferable for the hard wear resistant coating 104 to have a thickness of 0.02 mm or more and 0.0 mm or less, and for the undercoat 102 to have a thickness of 0.02 mm or more and 0.30 mm or less. By setting the thicknesses of the undercoat 102 and the hard wear resistant coating 104 to the range described above, it is possible to prevent the loss of the hard wear resistant coating 104 due to the abrasion, and to allow the undercoat 102 to protect the surface of the base material 100 from losing its thickness. Furthermore, it is preferable, representing the thickness of the base material 100 as one, to set the thickness of the undercoat 102 to 0.1, and to set the thickness of the hard wear resistant coating 104 to 0.1, for example. In other words, it is preferable to set the thickness of the undercoat 102 and that of the hard wear resistant coating 104 to approximately the same size. Furthermore, because each of these coatings experiences a manufacturing error of 30% or so, it is preferable to set the ratio of the thicknesses of the undercoat and of the hard wear resistant coating to 0.7 or higher and 1.3 or lower.

Furthermore, the hard wear resistant coating 104 may be formed only on the contact block, as in the embodiment. In this manner, it is possible to reduce the area on which the hard wear resistant coating 104 is formed, and therefore, it becomes possible to form the hard wear resistant coating 104 efficiently.

In the turbine rotor blade 28 according to the embodiment, the undercoat and the thermal barrier coating (TBC) are also laid on the surfaces of the blade body 42, that is, surfaces corresponding to the suction surface (suction-side surface) 42*a* and the pressure surface (pressure-side surface) 42*b*, on the base material. The undercoat is an oxidation resistant coating that is the same as the coating 101. The TBC is a ceramics film made of oxide ceramics applied on the surface of the undercoat, for example. The undercoat serves as a bond coating for the TBC. The ceramics film may include a $ZrO_2$-base material, particularly yttria stabilized zirconia (YSZ), which is $ZrO_2$ partially or fully stabilized with $Y_2O_3$. The TBC is thermally insulating, and protects the base material.

Furthermore, in the turbine rotor blade 28 according to the embodiment, the coating 101 is provided across the entire suction-side contact surface 110 and pressure-side contact surface 140, but the embodiment is not limited thereto. The oxidation resistant coating 102 does not need to be provided to the entire contact surfaces, and may be provided to areas not likely to be brought into contact with the facing contact surface. In other words, it is possible for the oxidation resistant coating 102 not to be provided to a part of the area brought into contact with the facing contact surface. Furthermore, it is also possible not to provide the hard wear resistant coating 104 to areas not likely to be brought into contact with the facing contact surface. Furthermore, the coating 101 according to the embodiment including the two layers may be provided only to the contact surface, as described above, but it is also possible to provide the coating 101 to the other part of the tip shroud, e.g., to the fin. Furthermore, the coating 101 according to the embodiment including two layers may be provided to a part that is on the radially inner side of the fin, or a part that is on the radially inner side of the fin and that is also on the inner side of a circumferential end in the axial direction. Alternatively, the coating 101 may be provided to a part of an end in the circumferential direction, on the upstream or the downstream side in the direction in which the gas flows.

FIG. 7 is a flowchart illustrating one example of a contact surface manufacturing method. On a turbine rotor blade, the contact surface is formed by forming the coating 101 on the area corresponding to the contact surface of the contact block 50, 60 made from the base material 100. The contact surface may be manufactured by a worker performing a process, or with equipment that automatically creates the contact surface. In the example explained below, it is assumed that this task is performed by a worker.

The worker carries out machining of a blade (Step S12). The worker manufacturers a structure made from the base material. An example of such a rotor blade includes a shrouded rotor blade. A shrouded rotor blade is arranged in plurality along a predetermined direction, e.g., the direction in which the turbine rotor rotates, and has a contact block where the contact surface is to be formed. The blade is manufactured by casting or forging, and machining. When the base material is to be casted, a base material such as a CC material, a DS material, or an SC material may be used. Explained below is an example in which CC material is used as the base material, but the embodiment is not limited thereto, and the base material may be a DS material or an SC material. Furthermore, the blade may be manufactured by three-dimensional additive manufacturing.

The worker then applies a surface treatment to the base material (Step S14). Specifically, the worker washes a part that is to become the contact surface of the contact block made of the base material, and applies blasting to the part. The worker also masks the area other than the area to be applied with the treatment.

The worker then forms an undercoat corresponding to a contact portion, on a part that is to become the contact surface of the contact block (Step S16). An undercoat that is to be the oxidation resistant coating is formed on the surface that is to become the contact surface of the base material. As a material of the oxidation resistant coating, it is possible to use an alloy material such as MCrAlY that is more oxidation resistant than the base material, as mentioned earlier. For example, the undercoat is formed by heating the surface of the base material, and thermally spraying the alloy material or the like onto the surface of the base material. The undercoat may be formed on the surface of the base material using a method such as atmospheric plasma spraying, high velocity flame spraying, low pressure plasma spraying, or atmospheric plasma spraying.

The worker then forms a contact surface (Step S18). Specifically, the contact surface is formed by forming a hard wear resistant coating on the surface of the undercoat. As the hard wear resistant coating, a cobalt-base abrasion resistant material such as Tribaloy (registered trademark) may be used. The hard wear resistant coating may be formed on the surface of the undercoat using a method such as atmospheric plasma spraying, high velocity flame spraying, low pressure plasma spraying, or atmospheric plasma spraying.

The worker then performs tip brazing and a stabilization treatment (Step S20). Specifically, the worker brazes the base material, cools the base material slowly, and solutionizes the base material as a stabilization treatment. Brazing is a process of melting a brazing filler metal by heating the brazing filler metal while the brazing filler metal is disposed on the base material, and joining the brazing filler metal to the base material. As the brazing filler metal, a material such as Amdry (registered trademark) DF-6A is used, for example. In such a case, the liquidus temperature of the brazing filler metal is 1155 degrees Celsius or so, for example. The amount of the brazing filler metal used in the brazing is adjusted in advance, by carrying out experiments or the like. In the brazing, the base material can be thermally treated at a temperature at which the brazing filler metal melts, e.g., at 1175 degrees Celsius or higher and 1215 degrees Celsius or lower.

The stabilization (solution treatment) is a process of heating the base material to solutionize and to grow a gamma prime phase that is an intermetallic compound in the base material. In the solution treatment, the base material can be thermally treated at a temperature lower than that used in the brazing, e.g., at a temperature of 1100 degrees Celsius or higher and 1140 degrees Celsius or lower. This thermal treatment also serves to improve the adhesiveness between the base material, the undercoat, and the hard wear resistant coating.

The worker then carries out a surface treatment and masking (Step 322). Specifically, the worker performs a surface treatment to the surface of the turbine rotor blade, and a masking process for masking the area other than the blade surface.

The worker then forms the undercoat on the blade surface (Step 324). Specifically, an undercoat that is to become the oxidation resistant coating is formed on the blade surface of the base material. As a material of the oxidation resistant coating, it is possible to use an alloy material such as MCrAlY that is more oxidation resistant than the base material, as mentioned earlier. For example, the undercoat is formed by heating the surface of the base material, and thermally spraying the alloy material or the like onto the surface of the base material.

The worker then forms a topcoat on the blade surface (Step S26). As the topcoat, a thermal barrier coating (TBC) is formed. The thermal barrier coating is formed by thermal spraying.

The worker then carries out a thermal diffusion treatment (Step S28). Specifically, by carrying out an aging treatment to heat the solutionized base material, the gamma prime phase having grown in the base material during the solution treatment is allowed to grow further, and a gamma prime phase with smaller grain diameters, being smaller than those in the gamma prime phase resultant of the solution treatment, are allowed to precipitate. This gamma prime phase with smaller grain diameters enhances the strength of the base material. Therefore, the aging treatment serves as to achieve a final adjustment of the strength and the ductility of the base material, by allowing the gamma prime phase with smaller grain diameters to precipitate, and improving the strength of the base material. The temperature used in the aging treatment may be set within a range of 830 degrees Celsius or higher and 870 degrees Celsius or lower, for example. After being subjected to the aging treatment for a predetermined length of time, by stopping the heater in the heating furnace, and supplying cooling gas into the heating furnace, the base material is cooled quickly (quenched) at a temperature-reduction speed of 30 degrees Celsius/min or so.

The worker then performs an inspection and a finishing process (Step S30). The worker performs an appearance inspection, for example, and takes care of the contact surface.

As illustrated in FIG. 7, it is possible to form a hard wear resistant coating (abrasion resistant coating) on the oxidation resistant coating by forming an undercoat (oxidation resistant coating) on the surface that is to become the contact surface, and then forming the hard wear resistant coating on the undercoat, as coating. In this manner, it is possible to form a contact block in which the base material is protected by the oxidation resistant coating even when the hard wear resistant coating is damaged. For example, even when the hard wear resistant coating is lost, the contact with the facing contact surface is lost, and when the surface becomes exposed to the atmosphere, the base material can be protected by the oxidation resistant coating. In this manner, it is possible to achieve a highly durable contact surface.

Figure 8:
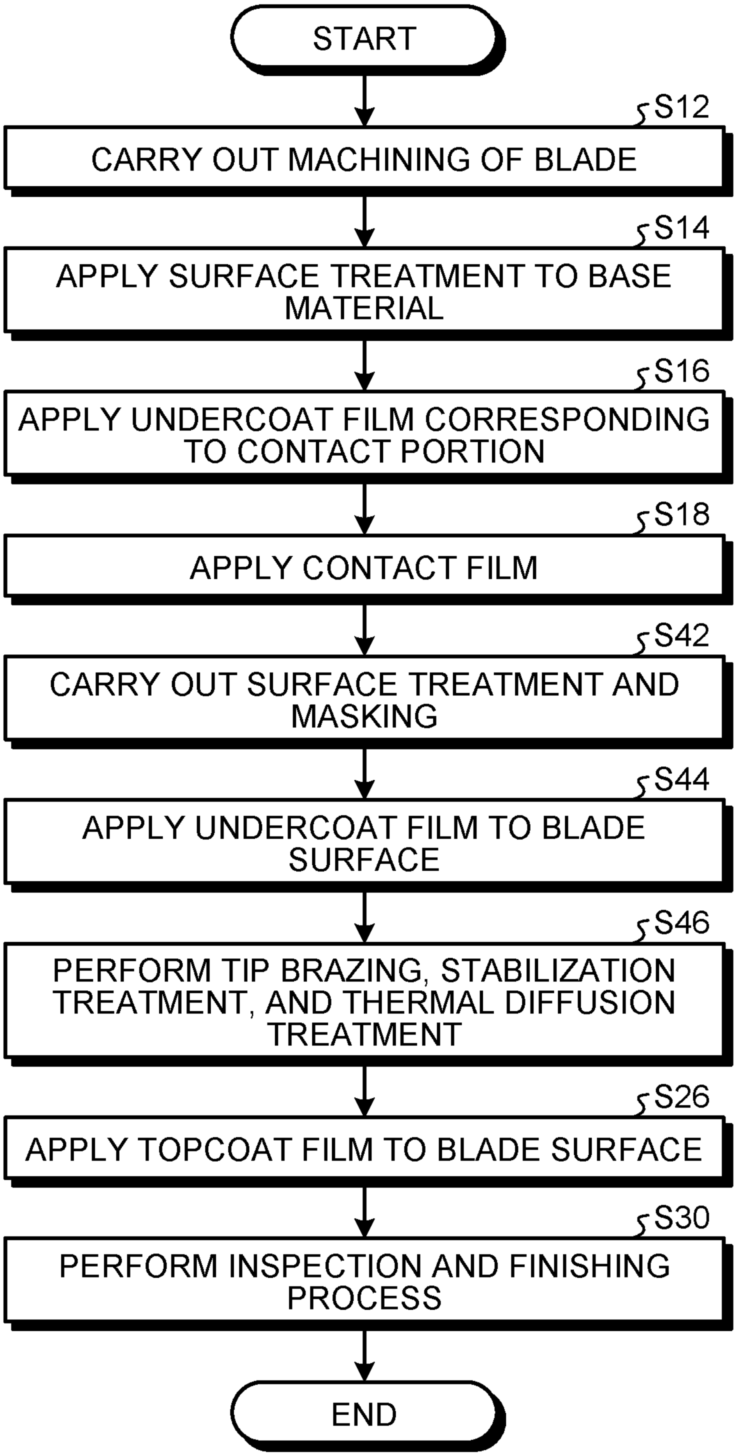
FIG. 8 is a flowchart illustrating one example of the contact surface manufacturing method.

Another example of the contact surface manufacturing method will now be explained. FIG. 8 is a flowchart illustrating one example of the contact surface manufacturing method. When steps illustrated in FIG. 8 are the same as those in the contact surface manufacturing method illustrated FIG. 7, detailed explanations thereof will be omitted.

The worker carries out machining of a blade (Step S12). The worker then applies a surface treatment to the base material (Step S14). The worker then forms an undercoat corresponding to a contact portion, on a part that is to become the contact surface of the contact block (Step S16).

The worker then forms a contact surface (Step S18). The worker then carries out a surface treatment and masking (Step S42). Specifically, the worker performs a surface treatment to the surface of the turbine rotor blade, and a masking process for masking the area other than the blade surface. The worker then forms an undercoat on the blade surface (Step S44).

The worker then performs tip brazing, the stabilization treatment, and a thermal diffusion treatment (Step S46). Specifically, the treatment at Step S28 is performed successively to the treatment at Step S20 in FIG. 7 explained above.

The worker then forms a topcoat on the blade surface (Step S26). The worker then performs an inspection and a finishing process (Step S30).

As illustrated in FIG. 8, by forming the undercoat (oxidation resistant coating) on the contact surface and the blade surface before carrying out the tip brazing and the stabilization treatment, and then performing the thermal diffusion treatment together with the tip brazing and the stabilization treatment, these thermal treatments can be carried out successively. In this manner, it is possible to form the undercoat on the contact surface while improving the process efficiency.

Another example of the contact surface manufacturing method will now be explained FIG. 9 is a flowchart illustrating one example of the contact surface manufacturing method. When the steps illustrated in FIG. 9 are the same as those in the contact surface manufacturing method illustrated in FIG. 8, detailed explanations thereof will be omitted.

The worker carries out machining of a blade (Step S12). The worker then applies a surface treatment to the base material (Step S14). Specifically, the worker washes a part that is to become the contact surface of the contact block made of the base material, and applies blasting to the part.

The worker masks the area other than the area to be applied with the treatment (the area that is to become the contact surface).

The worker forms an undercoat corresponding to a contact portion, on a part that is to become the contact surface of the contact block (Ste S16). The worker then forms the undercoat on the blade surface (Step S52). The same treatment equipment may be used to form the undercoat on the contact portion and to form the undercoat on the blade surface, successively.

The worker then forms the contact surface (Step S18). The worker then performs tip brazing, the stabilization treatment, and the thermal diffusion treatment (Step S46). The worker then forms a topcoat on the blade surface (Step S26). The worker then performs an inspection and a finishing process (Step S30).

As illustrated in FIG. 9, by forming the undercoats of the contact surface and of the blade surface successively, the undercoats can be applied in one process. In this manner, the step of applying a surface treatment to the blade surface and masking the blade surface can be omitted. Furthermore, by forming the undercoat (oxidation resistant coating) on the contact surface and the blade surface before carrying out the tip brazing and the stabilization treatment, and performing the thermal diffusion treatment together with the tip brazing and the stabilization treatment, these thermal treatments can be carried out successively, in the same manner as in the process illustrated in FIG. 8. In this manner, it is possible to form the undercoat on the contact surface while improving the process efficiency.

The contact surface manufacturing method described above can be used in manufacturing the contact surface of a turbine rotor blade that is being newly manufactured, but the embodiment is not limited thereto. The contact surface manufacturing method described above may also be applied to a situation in which coating is to be applied to repair a used turbine rotor blade. When the contact surface of the turbine rotor blade is to be repaired, the machining at Step S12 is replaced with a step of removing a used contact surface from the contact block of the used turbine rotor blade. With this step, the method is modified as a contact surface manufacturing method in which the used contact surface is removed, and a new contact surface is manufactured at the step described above.

REFERENCE SIGNS LIST

11 compressor
12 combustor
13 turbine
27 stator blade
28 rotor blade (turbine rotor blade)
32 rotor (rotational shaft)
41 blade root
42 blade body
42*a* suction surface (suction-side surface)
42*b* pressure surface (pressure-side surface)
43 tip shroud
44 seal fin (fin)
46 suction-side tip shroud
47 suction-side end area
49 pressure-side end area
48 pressure-side tip shroud
50, 60 contact block
51 suction-side cover plate
52 downstream suction-side cover plate
56 upstream suction-side cover plate
54 end surface of pressure-side cover
64 end surface of suction-side cover
58, 68 connecting portion
61 pressure-side cover plate
62 upstream pressure-side cover plate
66 downstream pressure-side cover plate
100 base material
101 coating
102 undercoat (oxidation resistant coating)
104 hard wear resistant coating (abrasion resistant coating)
110 contact surface
140 contact surface

The invention claimed is:

1. A turbine rotor blade comprising:
a blade body; and
a tip shroud on a tip of the blade body,
wherein the tip shroud has a contact block configured to face a tip shroud of an adjacent turbine rotor blade, and
wherein the contact block includes:
a base material;
an oxidation resistant coating made of a MCrAlY alloy on a surface of the base material; and
a hard wear resistant coating on a surface of the oxidation resistant coating.

2. The turbine rotor blade according to claim 1, wherein the MCrAlY alloy is a CoNiCrAlY alloy.

3. The turbine rotor blade according to claim 1, wherein:
the hard wear resistant coating has a thickness of 0.02 mm or more and 0.30 mm or less; and
the oxidation resistant coating has a thickness of 0.02 mm or more and 0.20 mm or less.

4. The turbine rotor blade according to claim 1, wherein a thickness of the oxidation resistant coating divided by a thickness of the hard wear resistant coating is 0.7 or more and 1.3 or less.

5. The turbine rotor blade according to claim 1, wherein the oxidation resistant coating is at least on an area of a surface of the contact block that is configured not to be brought into contact with a contact block of the adjacent turbine rotor blade.

6. The turbine rotor blade according to claim 1, wherein the hard wear resistant coating is only on the contact block.

7. The turbine rotor blade according to claim 1, wherein the blade body has a thermal barrier coating on a blade surface of the turbine rotor blade.

8. A contact surface manufacturing method for forming a contact surface on a contact block of a tip shroud for a turbine rotor blade, the contact surface manufacturing method comprising the steps of:
forming an oxidation resistant coating made of a MCrAlY alloy on a surface of a base material; and
forming a hard wear resistant coating on a surface of the oxidation resistant coating.

9. The contact surface manufacturing method according to claim 8, further comprising the steps of:
forming an oxidation resistant coating on a blade surface of the turbine rotor blade after the step of forming the hard wear resistant coating; and
performing tip brazing, a stabilization treatment, and a thermal diffusion treatment after the step of forming the oxidation resistant coating on the blade surface of the turbine rotor blade.

10. The contact surface manufacturing method according to claim 8, further comprising the step of forming an oxidation resistant coating on a blade surface of the turbine rotor blade before the step of forming the hard wear resistant coating.

11. The contact surface manufacturing method according to claim 8, wherein:

the turbine rotor blade is a used turbine rotor blade; and the contact surface manufacturing method further comprises the step of removing a used contact surface on a surface of the contact block before the step of forming the oxidation resistant coating.

* * * * *